(12) United States Patent
Han et al.

(10) Patent No.: US 11,056,679 B2
(45) Date of Patent: Jul. 6, 2021

(54) POSITIVE ELECTRODES WITH ACTIVE MATERIALS AND TEMPORARY LITHIUM ADDITIVES FOR LITHIUM ION ELECTROCHEMICAL CELLS

(71) Applicant: GRU Energy Lab Inc., San Jose, CA (US)

(72) Inventors: Song Han, Foster City, CA (US); Sa Zhou, San Jose, CA (US); Xiaohua Liu, Mountain View, CA (US)

(73) Assignee: GRU ENERGY LAB INC., San Jose, CA (US)

( * ) Notice: Subject to any disclaimer, the term of this patent is extended or adjusted under 35 U.S.C. 154(b) by 174 days.

(21) Appl. No.: 16/514,957

(22) Filed: Jul. 17, 2019

(65) Prior Publication Data

US 2020/0044231 A1 Feb. 6, 2020

Related U.S. Application Data

(60) Provisional application No. 62/712,606, filed on Jul. 31, 2018.

(51) Int. Cl.
| | |
|---|---|
| *H01M 4/04* | (2006.01) |
| *H01M 4/48* | (2010.01) |
| *H01M 10/0525* | (2010.01) |
| *H01M 10/44* | (2006.01) |
| *H01M 4/02* | (2006.01) |

(52) U.S. Cl.
CPC ......... *H01M 4/0445* (2013.01); *H01M 4/483* (2013.01); *H01M 10/0525* (2013.01); *H01M 10/446* (2013.01); *H01M 2004/028* (2013.01)

(58) Field of Classification Search
CPC ...... H01M 4/04; H01M 4/48; H01M 10/0525; H01M 10/44
See application file for complete search history.

(56) References Cited

U.S. PATENT DOCUMENTS

| | | | | |
|---|---|---|---|---|
| 5,567,539 A | * | 10/1996 | Takahashi | H01M 4/62 429/57 |
| 8,685,573 B2 | | 4/2014 | Okuda et al. | |
| 2010/0308253 A1 | * | 12/2010 | Swift | H01M 4/483 252/62.2 |

(Continued)

*Primary Examiner* — Kenneth J Douyette
(74) *Attorney, Agent, or Firm* — Kwan & Olynick LLP (57) ABSTRACT

Provided are methods of introducing additional lithium ions into lithium-ion electrochemical cells as well as positive electrodes, comprising these additional lithium ions. A method may involve introducing a temporary lithium additive into a positive electrode, such as mixing the additive into slurry used for coating the electrode. The positive electrode also comprises a positive active material, different from the temporary lithium additive and used as a source of primary lithium ions. The positive active material is operable to release and also later to receive lithium ions during cycling. The temporary lithium additive is operable to release additional lithium ions during its decomposition, but not to receive any lithium ions thereafter. The amount of these additional lithium ions may be selected based on expected lithium ion losses in the cell. The temporary lithium additive may decompose when applying a voltage between the electrodes, e.g., during initial cycling.

19 Claims, 8 Drawing Sheets

(56) References Cited

U.S. PATENT DOCUMENTS

| | | | |
|---|---|---|---|
| 2012/0247963 A1* | 10/2012 | Utsunomiya | H01M 10/44 205/57 |
| 2014/0329151 A1 | 11/2014 | Onizuka et al. | |
| 2015/0064568 A1* | 3/2015 | Yushin | H01M 10/0525 429/233 |
| 2018/0114978 A1* | 4/2018 | Armacanqui | H01M 4/364 |

* cited by examiner

POSITIVE ELECTRODES WITH ACTIVE MATERIALS AND TEMPORARY LITHIUM ADDITIVES FOR LITHIUM ION ELECTROCHEMICAL CELLS

CROSS-REFERENCE TO RELATED APPLICATIONS

This application claims the benefit under 35 U.S.C. § 119(e) of U.S. Provisional Patent Application No. 62/712,606, entitled: "Positive Electrodes with Active Materials and Temporary Lithium Additives for Lithium Ion Electrochemical Cells", filed on Jul. 31, 2018, which is incorporated herein by reference in its entirety for all purposes.

TECHNICAL FIELD

The present disclosure relates generally to prelithiation of positive electrodes in electrochemical cells or, more specifically, to positive electrodes comprising positive active materials, providing primary lithium ions, and temporary lithium additives, providing additional lithium ions.

BACKGROUND

When a lithium ion cell is fabricated and before any cycling occurs, lithium ions are initially stored in its positive electrode. These lithium ions are then released from the positive electrode and shuffled/cycled between the positive and negative electrodes, e.g., moving to the negative electrode during a charge half-cycle and returning back to the positive electrode during a discharge half-cycle. Different undesirable reactions may occur in the cell during initial and later cycling, such as forming a solid-electrolyte interphase (SEI) layer and permanent trapping a portion of lithium ions in this layer. These reactions may reduce the amount of lithium ions available for cycling and, therefore, reduce the cell capacity.

Various approaches have been proposed to introduce additional lithium ions into a lithium ion cell in order to compensate for these losses. One approach is introducing lithium metal directly into the negative electrode, prior to fabricating and cycling of the cell. However, achieving uniform distribution of the lithium metal on the negative electrode can be difficult. However, uniform distribution is important from the safety standpoint. For example, lithium clusters may form lithium dendrites and eventually short the cell. Furthermore, lithium metal is very reactive and requires special handing and environment, which complicates the overall process and adds to the battery costs. For example, lithium metal rapidly forms lithium hydroxide on its surface when exposed to ambient air, which contains some moisture.

What is needed are new methods of introducing additional lithium ions into lithium-ion electrochemical cells.

SUMMARY

Provided are methods of introducing additional lithium ions into lithium-ion electrochemical cells as well as positive electrodes, comprising these additional lithium ions. A method may involve introducing a temporary lithium additive into a positive electrode, such as mixing the additive into slurry used for coating the electrode. The positive electrode also comprises a positive active material, different from the temporary lithium additive and used as a source of primary lithium ions. The positive active material is operable to release and also later to receive lithium ions during cycling. The temporary lithium additive is operable to release additional lithium ions during its decomposition, but not to receive any lithium ions thereafter. The amount of these additional lithium ions may be selected based on expected lithium ion losses in the cell. The temporary lithium additive may decompose when applying a voltage between the electrodes, e.g., during initial cycling.

Provided is a method of introducing additional lithium ions into a lithium-ion electrochemical cell using a temporary lithium additive. In some examples, the method comprises introducing the temporary lithium additive into a positive electrode. The positive electrode further comprises a positive active material. The positive active material is different from the temporary lithium additive and comprises primary lithium ions. The method also comprises introducing an electrolyte between the positive electrode and a negative electrode. Furthermore, the method comprises applying a voltage between the positive electrode and the negative electrode thereby decomposing the temporary lithium additive to produce the additional lithium ions and a decomposition product.

In some examples, the temporary lithium additive is selected from the group consisting of lithium hydroxide (LiOH), lithium oxide ($Li_2O_2$), and lithium azide ($LiN_3$). In the same or other examples, the temporary lithium additive comprises a first temporary lithium additive and a second temporary lithium additive, having a different composition from the first temporary lithium additive. The weight ratio of the temporary lithium additive in an active material layer of the positive electrode is selected such that the ratio of the additional lithium ions to the primary lithium ions is between about 0.1% and 30%. In some examples, the temporary lithium additive is uniformly distributed throughout an active material layer of the positive electrode.

In some examples, the positive active material is selected from the group consisting of lithium nickel cobalt aluminum oxide (NCA), lithium manganese nickel oxide (LMNO), lithium iron phosphate (LFP), lithium nickel manganese cobalt oxide (NMC), and lithium cobalt oxide (LCO). The positive electrode may further comprise a polymer binder and/or a conductive additive. In some examples, introducing the temporary lithium additive into the positive electrode comprises (a) mixing the temporary lithium additive and the positive active material into slurry, (b) coating the slurry onto a current collector, and (3) drying the slurry on the current collector to form an active material layer.

In some example, the voltage is within an operating range of the lithium-ion electrochemical cell. For example, the voltage may be between about 0.1V and 4.5V.

In some examples, the method further comprises removing the decomposition product from the lithium-ion electrochemical cell, e.g., by reducing pressure within an interior cavity of the lithium-ion electrochemical cell and/or replacing the electrolyte with a permanent electrolyte. In some examples, the composition of the electrolyte is different from composition of the permanent electrolyte.

Also provided is a positive electrode for use in a lithium-ion electrochemical cell. In some examples, the positive electrode comprises a positive active material, comprising primary lithium ions. The positive electrode also comprises a temporary lithium additive, comprising additional lithium ions and configured to decompose when the positive electrode is subjected to a decomposition voltage. In some examples, the temporary lithium additive is selected from the group consisting of lithium hydroxide (LiOH), lithium oxide ($Li_2O_2$), and lithium azide ($LiN_3$). The temporary lithium additive may comprise a first temporary lithium additive and a second temporary lithium additive, having a different composition from the first temporary lithium additive. In some examples, the weight ratio of the temporary lithium additive in an active material layer of the positive electrode is selected such that a ratio of the additional lithium ions to the primary lithium ions is between about 0.1% and 30%. The temporary lithium additive may be uniformly distributed throughout an active material layer of the positive electrode.

DETAILED DESCRIPTION

In the following description, numerous specific details are set forth in order to provide a thorough understanding of the present invention. The present invention may be practiced without some or all of these specific details. In other instances, well known process operations have not been described in details to avoid obscuring the present invention. While the invention will be described in conjunction with the specific examples, it will be understood that it is not intended to limit the invention to the examples.

Introduction

A lithium ion electrochemical cell operates by shuttling lithium ions from its positive electrode to its negative electrode during a charge half-cycle and then back to the positive electrode during a discharge half-cycle. Initially, when the cell is built, these lithium ions are provided in the lithium ion cell as a part of its positive active material. The positive active material is a part of the positive electrode or, more specifically, of an active layer of the positive electrode, which may be supported on a current collector. Unfortunately, various undesirable processes may occur in the cell (e.g., during its cycling, in particular, initial cycling) resulting in a permanent loss of some lithium ions. The loss of lithium ions, available for shuttling/cycling, results in the capacity loss. One example of such undesirable process is formation of a solid-electrolyte interphase (SEI) layer on the surface of the negative electrode exposed to the electrode. The SEI layer permanently traps substantial amounts of lithium ions. For example, 5-10% of initially supplied lithium ions are typically lost with graphite-based negative electrodes. In another example, 30-50% of initially supplied lithium ions are lost with silicon oxide based negative electrodes.

Provided are methods and components (e.g., positive electrodes and electrochemical cells comprising these positive electrodes), in which additional lithium ions are provided on a positive electrode, besides primary lithium ions of the positive active material. These additional lithium ions may be released during initial cycling to compensate for permanent lithium losses, described above. In some examples, the release of these additional lithium ions may be in accordance with a specific timed profile, e.g., corresponding to the timing of lithium losses. In other words, the additional lithium ions provided in the positive electrode may not be released complete right away. For example, the cell voltage is specifically controlled, as described below, to have partial lithium ions released after a certain number of cycles (e.g., after every 50 cycles).

These additional lithium ions are provided by a lithium carrier material, which is a part of the positive electrode, like the positive active material. The lithium carrier material decomposes at a certain potential, which may be within an operating range for the positive electrode, e.g., between 0V and 5.0 V or, more specifically, 2.0V and 4.5 V. The operating range depends on the positive active material, while the decomposition potential depends on the lithium carrier material. It should be noted that initial cycling of the cell does not need to cover its entire operating range. For example, the cycling may be tuned for gradual release of additional lithium and/or controlled formation of the SEI layer (aka "formation cycling"). Furthermore, multiple temporary lithium additives may be used on the same positive electrode with different decomposition potentials.

A temporary lithium additive may be added into slurry together with a positive active material and then coated onto a current collector substrate. While lithium carrier materials, such as LiOH and $Li_2O_2$, are stable in air and various solvents used for slurries (e.g., water or NMP) and can withstand electrode fabrication processes (e.g., coating, drying, and calendaring), these materials can be easily decomposed when a positive electrode is brought to a certain voltage potential. The decomposition releases lithium ions and a decomposition product. The decomposition product can be removed from the lithium-ion electrochemical cell (e.g., using degassing, electrolyte flushing) or retained in the lithium-ion electrochemical cell.

FIGS. 1A-1D will now be described to provide some context to various features of this disclosure, which are further described below in more detail. Specifically, FIGS. 1A-1D are schematic illustrations of positive electrode 110 at different fabrication stages. Positive electrode 110 comprises current collector 112 and active material layer 120, disposed on and supported by current collector 112. In some examples, electrode 110 comprises another active material layer disposed on the opposite side of current collector 112, which may have the same composition and other characteristics as active material layer 120. These examples will be readily understood by one having ordinary skill in the art.

Active material layer 120 comprises positive active material 122 and temporary lithium additive 124. As noted above, positive active material 122 comprises primary lithium ions 123, while temporary lithium additive 124 comprises additional lithium ions 130. Once released from their respective materials, these lithium ions are indistinguishable and form a collective/general group of lithium ions available in a lithium-ion electrochemical cell for cycling between positive and negative electrodes. Some lithium ions from this group may be irreversibly trapped or consumed, while the remaining ones are available for cycling. As further described below, the amount of additional lithium ions 130 may be selected to match the amount of lithium ions, which are expected to be irreversibly lost. This matching approach allows maximizing utilization of positive active material 122. In other words, the amount of lithium ions available for cycling matched the amount of primary lithium ions 123, initially provided by positive active material 122. This is different from some conventional approaches where more positive active material 122 is provided to compensate for lithium ion losses and/or some of negative active material remains unutilized due insufficient amount of lithium in the system. The problem with these conventional approaches is that positive active material 122 comprises various additional components that may be heavy, in comparison for temporary lithium additive 124. For example, a molar weight ratio of lithium in lithium cobalt oxide (which a common positive active material) is only 7.1% while a molar weight ratio of lithium in lithium hydroxide is only 29.0%.

Figure 1A:
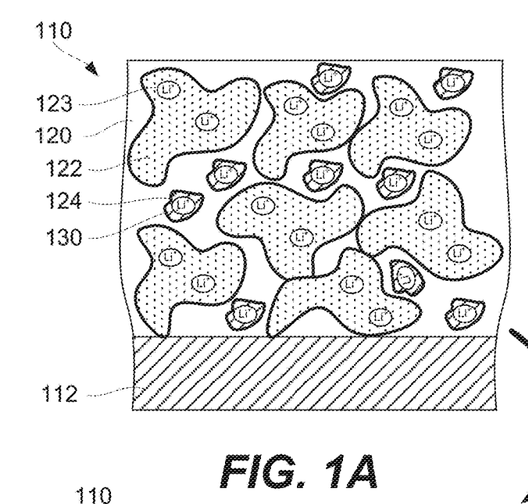
FIGS. 1A-1D are schematic illustrations of a positive electrode at different fabrication stages, showing the decomposition of a temporary lithium additive provided in the positive electrode causing the release of additional lithium ions, in accordance with some examples.

FIG. 1A illustrates a stage prior to decomposition of temporary lithium additive 124. At this stage, additional lithium ions 130 are parts of temporary lithium additive 124. For example, this stage may exist during fabrication of positive electrode 110, during arranging positive electrode 110 in a lithium-ion electrochemical cell (e.g., stacking or winding positive electrode 110 with a corresponding negative electrode), and even while introducing electrolyte between positive electrode 110 and the corresponding negative electrode. Furthermore, at this stage, primary lithium ions 123 are in positive active material 122 and separated from additional lithium ions 130. The amount of additional lithium ions 130 in positive electrode 110 is controlled by the amount of temporary lithium additive 124. More specifically, the ratio of additional lithium ions 130 to primary lithium ions 123 is controlled by controlling the ratio of temporary lithium additive 124 and positive active material 122, as well as selection of specific compositions for temporary lithium additive 124 and positive active material 122.

Figure 1B:
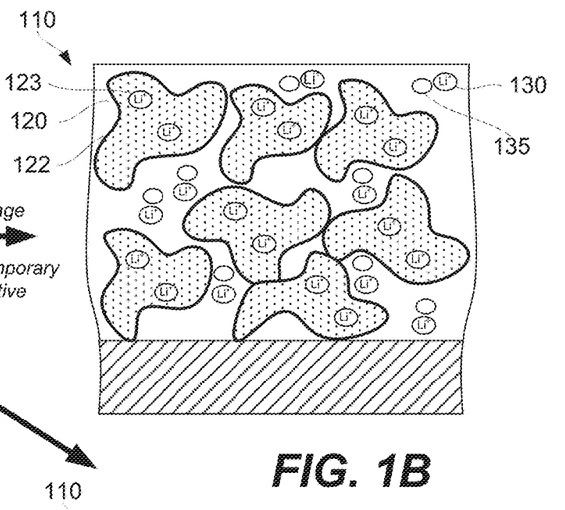
Figure 1C:
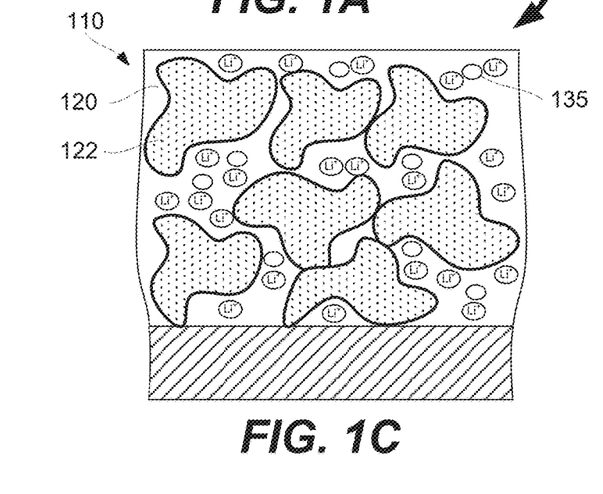
Figure 1D:
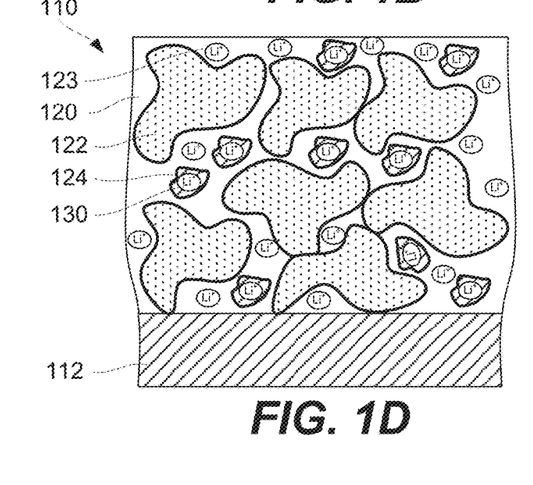

FIGS. 1B and 1C illustrate different examples of positive electrode 110 at a stage after decomposition of temporary lithium additive 124. In both examples, temporary lithium additive 124 is converted into additional lithium ions 130 and decomposition product 135. While FIGS. 1B and 1C illustrates additional lithium ions 130 and decomposition product 135 still being present in active material layer 120. In some examples, additional lithium ions 130 and/or decomposition product 135 may be released in the electrolyte during the decomposition or thereafter. Furthermore, in some examples, decomposition product 135 may be partially or completely removed from the electrochemical cell, e.g., when decomposition product 135 is a gas.

It is important to note that once temporary lithium additive 124 decomposes, it cannot be reformed. Additional lithium ions 130 released into the general group of lithium ions can be used for cycling and/or compensating for lithium ion losses. On the other hand, once positive active material 122 releases primary lithium ions 123 into the general group of lithium ions, positive active material 122 can later take back up to the same amount of lithium ions from the general group of lithium ions.

As explained above, the amount of additional lithium ions 130 is usually selected based on expected losses of lithium ions in the electrochemical cells. These losses may be depend on various factors, such as composition of the positive and negative electrodes (e.g., positive and negative active materials), surface areas of these electrodes, composition of the electrolyte, operating potential, and/or a ratio of the theoretical capacity of the negative electrode to the capacity of the positive electrode. In some examples, the ratio of additional lithium ions 130 relative to primary lithium ions 123 is between about 0.1% and 50% or, more specifically, between about 1% and 30%. While smaller amounts may not adequately compensate for lithium ion losses (resulting in a capacity fade), excess of lithium ions in the cell may cause lithium dendrite formation, which is not desirable. Therefore, the amount of additional lithium ions 130 is specifically tailored in accordance with the factors listed above. For example, the lithium ion losses in electrochemical cells with graphite-based electrodes may be up to 5-10% of primary lithium ions 123, due to an SEI layer formation. On the other hand, lithium ion losses in electrochemical cells with SiO-based electrodes may be up to 30-50% of primary lithium ions 123. SiO may form Li6Si2O7, Li4SiO4, LixSi, and $Li_2Si_2O_5$ with lithium ions. However, $Li_6Si_2O_7$ and $Li_4SiO_4$ are not reversible and these parts of Li get lost. So the total lost could go up to 50%.

In some examples, decomposition of temporary lithium additive 124 and release of additional lithium ions 130 is performed while primary lithium ions 123 are retained within positive active material 122 as, for example, schematically shown in FIG. 1B. For example. $Li_2S$ may be used as temporary lithium additive 124, while lithium cobalt oxide may be used as positive active material 122. $Li_2S$ releases lithium ions starting at 2.5V, while de-lithiation potential of lithium cobalt oxide is about 4.0V. Therefore, applying a voltage below 4.0V only releases primary lithium ions 123 from $Li_2S$. Alternatively, decomposition of temporary lithium additive 124 and release of additional lithium ions 130 may also cause release of primary lithium ions 123 from positive active material 122 as, for example, schematically shown in FIG. 1C. For example, $Li_2O_2$ used as temporary lithium additive 124, while lithium cobalt oxide may be used as positive active material 122. Lithium cobalt oxide will release primary lithium ions 123 at the same time when $Li_2O_2$ releases temporary lithium ions 124 because both materials delithiate at 4.0-4.5V. In this example, additional lithium ions 130 and primary lithium ions 123 are indistinguishable once released. In yet another example, release of primary lithium ions 123 from positive active material 122 may precede decomposition of temporary lithium additive 124 and release of additional lithium ions 130 as, for example, schematically shown in FIG. 1D. For example, a mixture $Li_3N$ is used as temporary lithium additive 124, while lithium cobalt oxide may be used as positive active material 122. Lithium cobalt oxide will release primary lithium ions 123 before $Li_3N$, which delithiates at 4.5V.

Method and Electrode Examples

Figure 2:
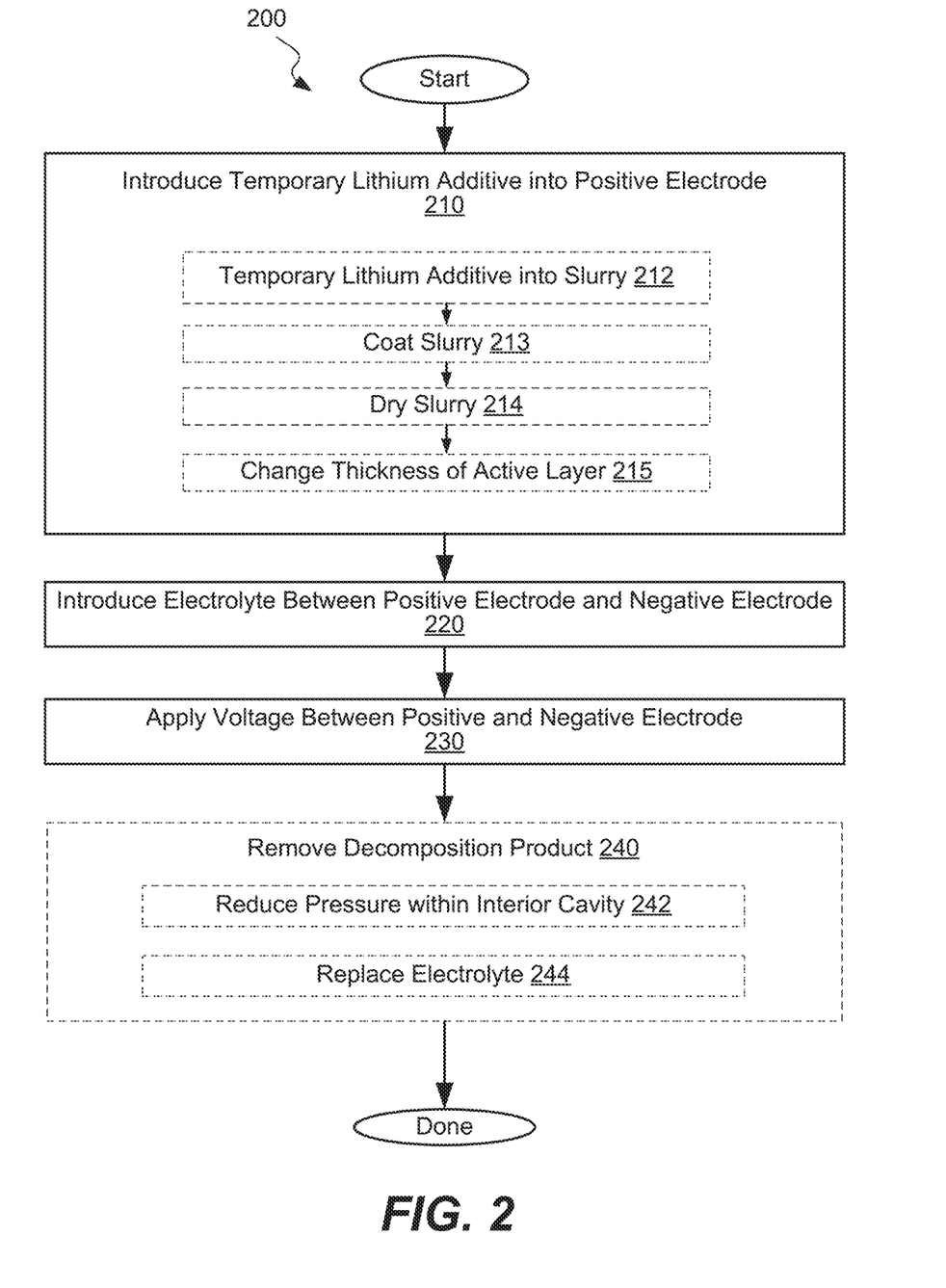
FIG. 2 is a process flowchart corresponding to a method of introducing additional lithium ions into a lithium-ion electrochemical cell using a temporary lithium additive, in accordance with some examples.

FIG. 2 is a process flowchart corresponding to method 200 of introducing additional lithium ions 130 into lithium-ion electrochemical cell 100, in accordance with some embodiments. Method 200 may commence with introducing temporary lithium additive 124 into positive electrode 110 during operation 210. Positive electrode 110 also comprises positive active material 122. While positive active material 122 is different from temporary lithium additive 124, both positive active material 122 and temporary lithium additive 124 comprise lithium ions, collectively forming a general group of lithium ions. Specifically, positive active material 122 comprises primary lithium ions 123, while temporary lithium additive 124 comprises additional lithium ions 130. A combination of primary lithium ions 123 and additional lithium ions 130 is referred to the general group of lithium ions.

Some examples of temporary lithium additive 124 include, but are not limited to lithium hydroxide (LiOH), lithium oxide ($Li_2O_2$), and lithium azide ($LiN_3$), lithium sulfate ($Li_2S$), lithium oxide ($Li_2O$), lithium fluoride (LiF), lithium nitride ($Li_3N$), antifluorite-type structure ($Li_5FeO_4$ or $5Li_2O \cdot Fe_2O_3$), $Li_2NiO_2$, $Li_6CoO_4$, and $Li_2MoO_3$. Temporary lithium additive 124 may be selected such that decomposition product 135, which is formed together with additional lithium ions 130, can be easily removed from lithium-ion electrochemical cell 100. For example, lithium hydroxide (LiOH) decomposes into lithium ions, oxygen, and water. Lithium oxide ($Li_2O_2$) decomposes into lithium ions and oxygen. As further described below, decomposition product 135, which are gases, may be removed by degassing the interior of lithium-ion electrochemical cell 100.

Some examples of positive active material 122 include, but are not limited to, lithium nickel cobalt aluminum oxide (NCA), lithium manganese nickel oxide (LMNO), lithium iron phosphate (LFP), lithium nickel manganese cobalt oxide (NMC), and/or lithium cobalt oxide (LCO). Other positive active material layer includes, but are not limited to, lithiated metal fluorides, e.g., $Li_xFeF_y$, $Li_xCuF_y$, or $Li_xNiF_y$, wherein x and y range from 0 to 3.

In some examples, the weight ratio of temporary lithium additive 124 in active material layer 120 of positive electrode 110 is selected such that a ratio of additional lithium ions 130 to primary lithium ions 123 is between about 0.1%-30% or, more specifically, between 1%-20%.

Figure 3A:
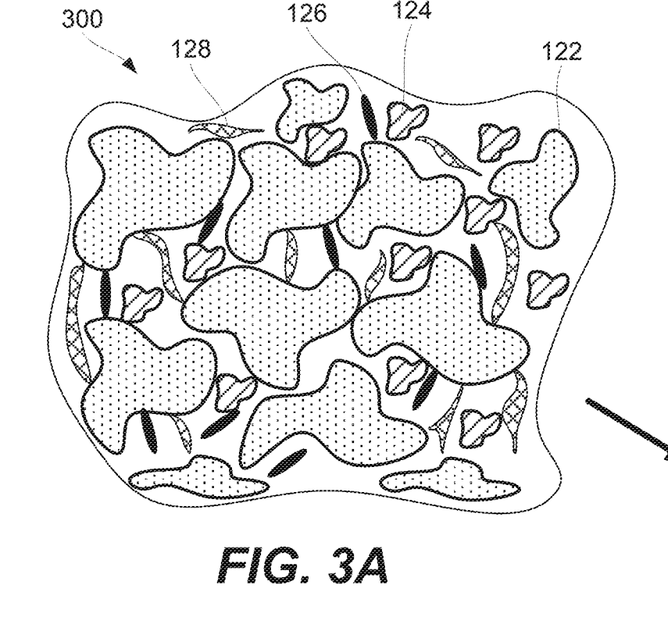
FIGS. 3A-3H are schematic illustrations of various stages of fabrication a lithium-ion electrochemical cell, in accordance with some examples.

Referring to block 212 in FIG. 2A, introducing temporary lithium additive 124 into positive electrode 110 (i.e., operation 210) may comprise mixing temporary lithium additive 124 and positive active material 122 into slurry 300 as, for example, schematically shown in FIG. 3A. Slurry 300 may also comprise a solvent, polymer binder 128 and, in some examples, conductive additive 126. Some examples of polymer binder 128 comprise styrene-butadiene rubber (SBR), polyvinylidene fluoride (PVDF), sodium carboxymethyl cellulose (CMC), ployacrylic acid (PAA), sodium Alginate (ALG), polyimide (PI), poly vinyl alcohol (PVA) and polyacrylonitrile (PAN). Some examples of conductive additive 126 include, but are not limited to, acetylene black, super P, carbon nanotube, and graphene.

Figure 3B:
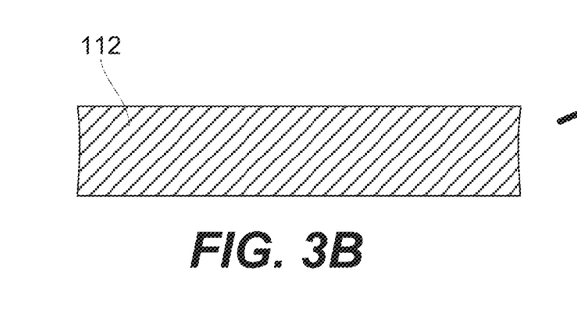
Figure 3C:
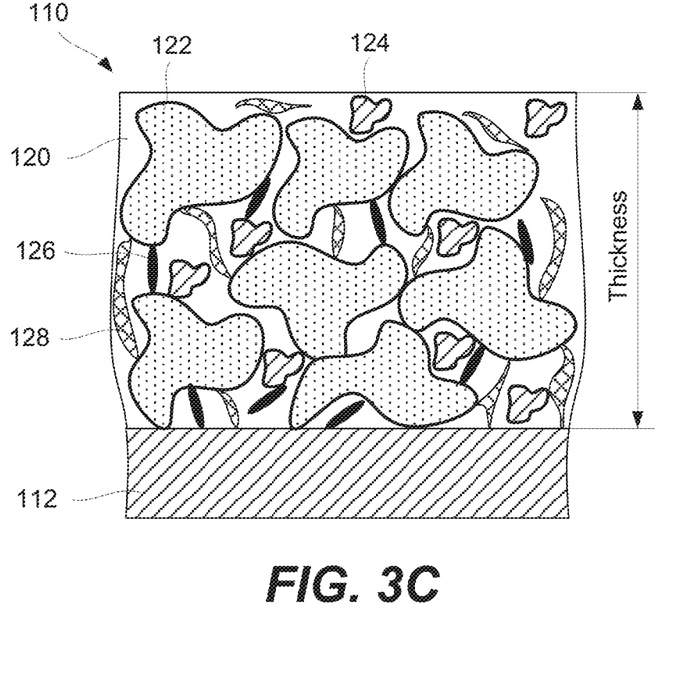

Referring to block 213 in FIG. 2A, operation 210 may further comprise coating slurry 300 onto current collector 112. This process is schematically shown by FIGS. 3A-3C. Referring to block 214 in FIG. 2A, operation 210 may further comprise drying slurry 300 on current collector 112 to form active material layer 120, e.g., removing one or more solvents from active material layer 120. Referring to block 215 in FIG. 2A, operation 210 may further comprise changing the thickness of active material layer 120. This process may be also used to change the porosity of active material layer 120. For example, a coated electrode may be passed through a roll press to reduce its thickness and decrease its porosity.

As schematically shown in FIG. 3C, temporary lithium additive 124 is uniformly distributed throughout active material layer 120 of positive electrode 110. Such distribution may be achieved by using a set of operations 212-215 described above, e.g., mixing temporary lithium additive 124 into slurry and coating the slurry onto the current collector substrate. For purposes of this disclosure, uniform distribution is defined as concentration variation of less than 10% in any two macro-portions (e.g., volume of at least 1 $cm^3$) of active material layer 120. The uniform distribution ensures uniform release of the additional lithium ions during decomposition of temporary lithium additive 124 and avoids localized concentration of lithium ions, which may result in potentially unsafe conditions.

Figure 3D:
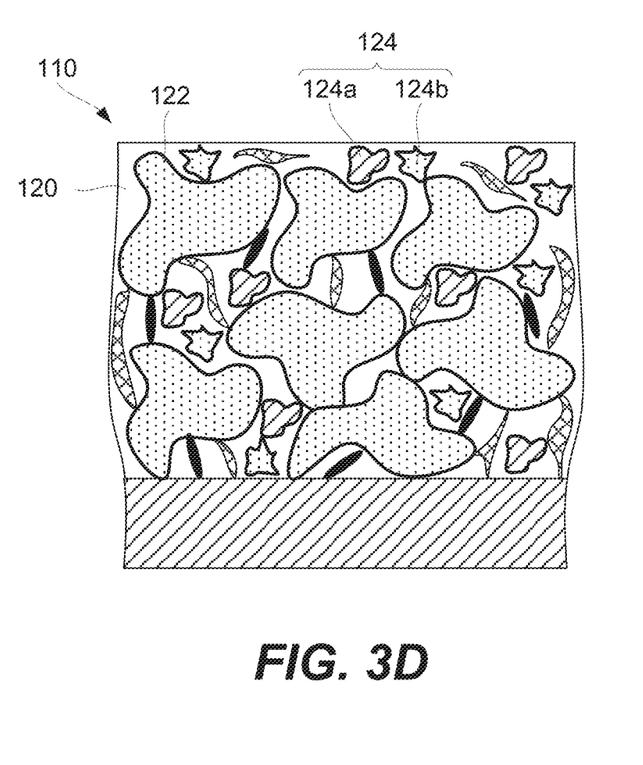

In some examples, temporary lithium additive 124 comprises first temporary lithium additive 124a and second temporary lithium additive 124b, as schematically shown in FIG. 3D. Second temporary lithium additive 124b has a different composition from first temporary lithium additive 124a. For example, a mixture of $LiN_3$ and may be used in the same active material layer 120. $LiN_3$ decomposes at 3.7 V, while LiOH decomposes at ~4.1V. In general, first temporary lithium additive 124a and second temporary lithium additive 124b may decompose at different voltages. As such, a combination of first temporary lithium additive 124a and second temporary lithium additive 124b may be use for controlled (e.g., gradual) introduction of additional lithium ions 130 than, for example, when a single temporary lithium additive is used. When temporary lithium additives are used, the release of additional lithium ions may be performed in a more gradual, stepped manner. For example, $LiN_3$ may decompose first upon reaching 3.7 V, while LiOH may remain intact at this potential. The amount of lithium ions corresponding to additional lithium ions released during decomposition of $LiN_3$ may be consumed in the battery (e.g., to form an SEI layer) before triggering decomposition of LiOH, e.g., by bringing the positive electrode to 4.1V. This stepped introduction of additional lithium ions prevents excessive and potentially unsafe concentration of lithium ions in the battery. It should be noted that the process of consuming lithium ions is gradual and may take multiple cycles. In other words, not all additional lithium ions are needed in the battery right away.

Figure 3E:
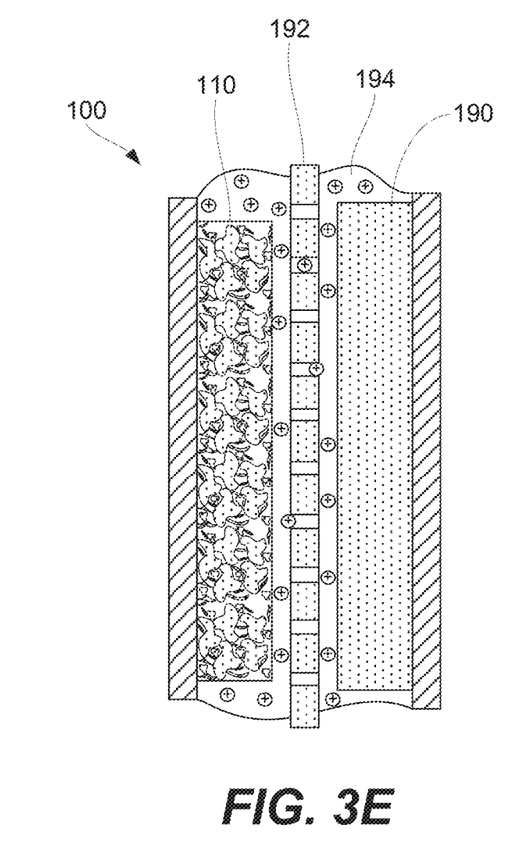

Method 200 proceeds with introducing electrolyte 194 between positive electrode 110 and negative electrode 190 during operation 220. Electrolyte 194 provides ionic communication between positive electrode 110 and negative electrode 190 and may receive additional lithium ions 130 and decomposition product 135, produced during decomposition of temporary lithium additive 124a. Electrolyte 194 may include one or more lithium containing salts and one or more solvents. Some examples of lithium containing salts include, but are not limited to, lithium imides, $LiPF_6$, $LiBF_4$, LiBOB. Some examples of solvents include, but are not limited to carbonates, such as cyclic carbonates and linear carbonates. Some examples of cyclic carbonates include ethylene carbonate (EC), propylene carbonate (PC), butylene carbonate (BC), vinylene carbonate (VC), dimethylvinylene carbonate (DMVC), vinylethylene carbonate (VEC), and fluoroethylene carbonate (FEC). The cyclic carbonate compounds may include at least two compounds selected from ethylene carbonate, propylene carbonate, vinylene carbonate, vinylethylene carbonate, and fluoroethylene carbonate. Some examples of linear-carbonate compounds include, but are not limited to, linear carbonates having an alkyl group, such as dimethyl carbonate (DMC), methyl ethyl carbonate (MEC), diethyl carbonate (DEC), methyl propyl carbonate (MPC), dipropyl carbonate (DPC), methyl butyl carbonate (MBC) and dibutyl carbonate (DBC). The alkyl group can have a straight or branched chain structure. FIG. 3E is a schematic illustration of lithium-ion electrochemical cell 100 with electrolyte 194 disposed between positive electrode 110 and negative electrode 190. FIG. 3E also shows separator 192, disposed between positive electrode 110 and negative electrode 190, and electronically isolating these electrodes, while allowing lithium ions to pass. Some examples of separator 192 include, but are not limited to, microporous polyolefin separators or separators including copolymers of vinylidene fluoride with hexafluoropropylene, perfluoromethyl vinyl ether, perfluoroethyl vinyl ether, or perfluoropropyl vinyl ether, including combinations thereof, or fluorinated ionomers.

Method 200 proceeds with applying a voltage between positive electrode 110 and negative electrode 190 during operation 230. This operation may be a part of the initial cycling of lithium-ion electrochemical cell 100, e.g., formation cycling. As such, the voltage applied during this operation may be within the operating range of lithium-ion electrochemical cell 100.

Figure 3F:
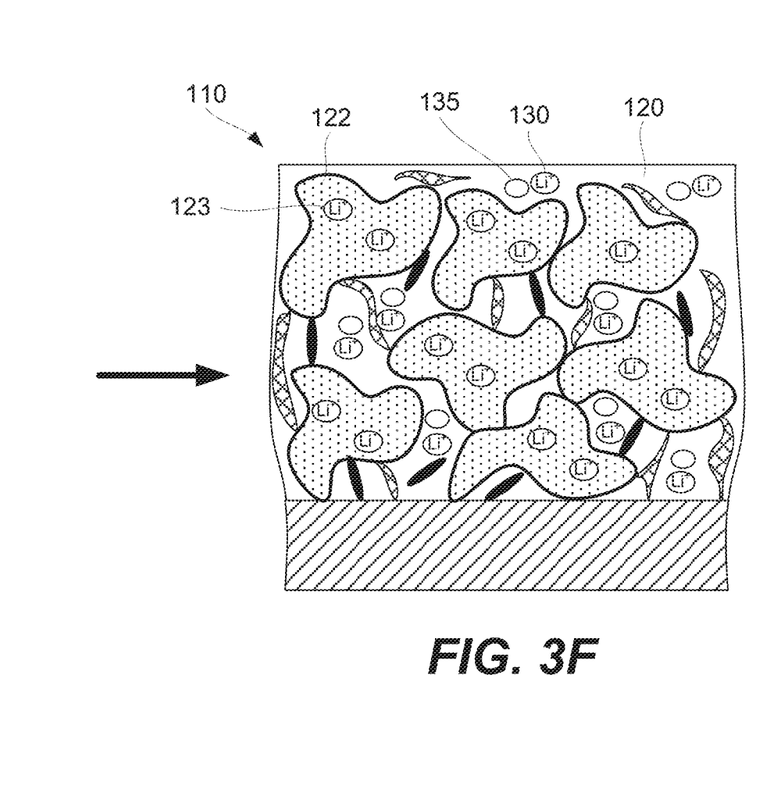

Application of the voltage (at a certain level) during operation 230 causes decomposition of temporary lithium additive 124 and production of additional lithium ions 130 and decomposition product 135 as, for example, schematically shown in FIG. 3F. The voltage applied during this operation depends on the composition of temporary lithium additive 124. For example, lithium hydroxide (LiOH) decomposes at ~4.1V, lithium oxide $Li_2O_2$ decomposes at decomposes at 4.3-4.7 V, while $LiN_3$ decomposes at ~3.7V.

The timing of this decomposition and production of additional lithium ions 130 may be controlled by the potential/the voltage level. In one example, lithium iron phosphate ($LiFePO_4$) used as positive active material 122, while a combination of $LiN_3$ and LiOH used as temporary lithium additive 124. Voltage of lithium iron phosphate cells is usually 2-4V. $LiN_3$ will decompose first at ~3.7V to release some of additional lithium ions 130. After cycling for a certain number of cycles up to 4.0 V, the cell voltage may be brought up (e.g., temporarily) to 4.1 V resulting in more of additional lithium ions 130 released during decomposition of LiOH. In some examples, the operating voltage may be between about 0.1V and 4.5 V, at least temporarily. For example, when the capacity fades to 80% of the initial capacity, the cell voltage may be brought up to 4.1V for one cycle to release temporary lithium additive 124 from LiOH.

Figure 3G:
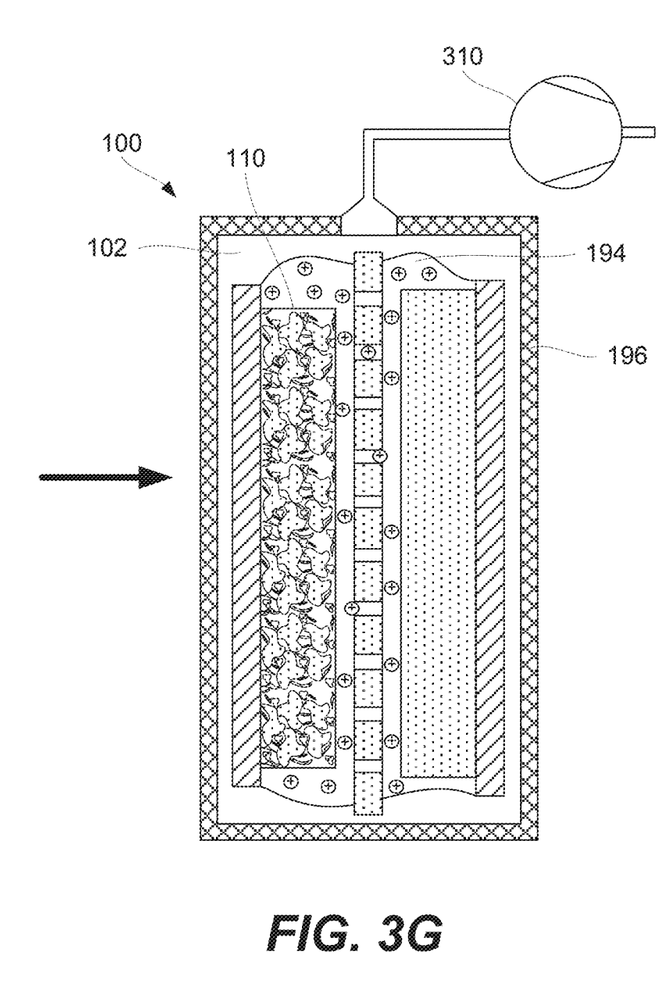

In some examples, method 200 may proceed with removing decomposition product 135 from electrochemical cell 100. In these examples, the interior of electrochemical cell 100 may be fluidly coupled with a vacuum pump or another such device. Removing decomposition product 135 may involve reducing the pressure within interior cavity 102 of electrochemical cell 100 as, for example, schematically shown in FIG. 3G. Specifically, FIG. 3G illustrates vacuum pump 310 fluidly coupled to interior cavity 102.

Figure 3H:
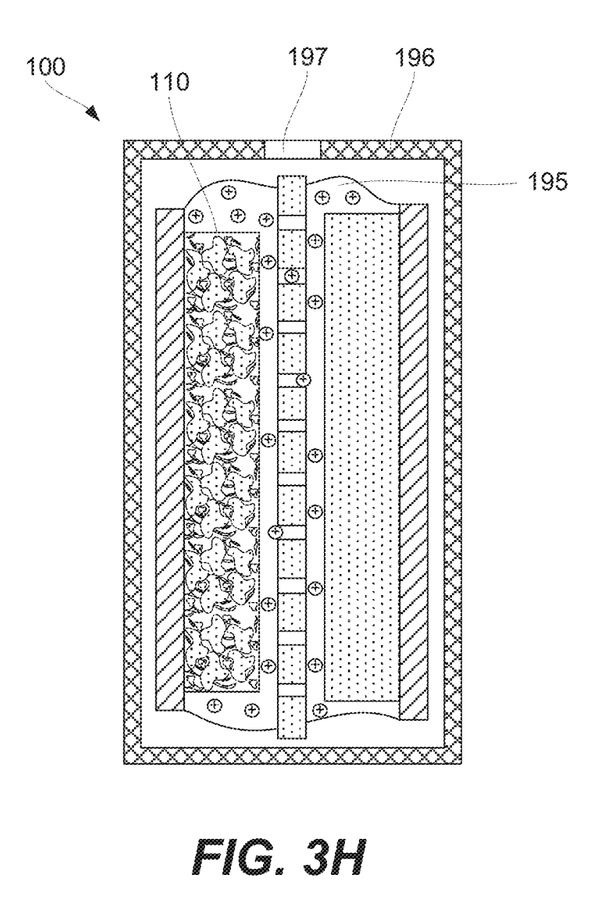

In the same or other examples, removing decomposition product 135 comprises replacing electrolyte 194 with permanent electrolyte 195. The composition of electrolyte 194 may be different from the composition of permanent electrolyte 195. FIG. 3H illustrates electrochemical cell 100 filled with permanent electrolyte 195. Removal of electrolyte 194 and addition of permanent electrolyte 195 may be performed, for example, through fill opening 197.

Examples of Electrochemical Cells/Applications

Figure 4:
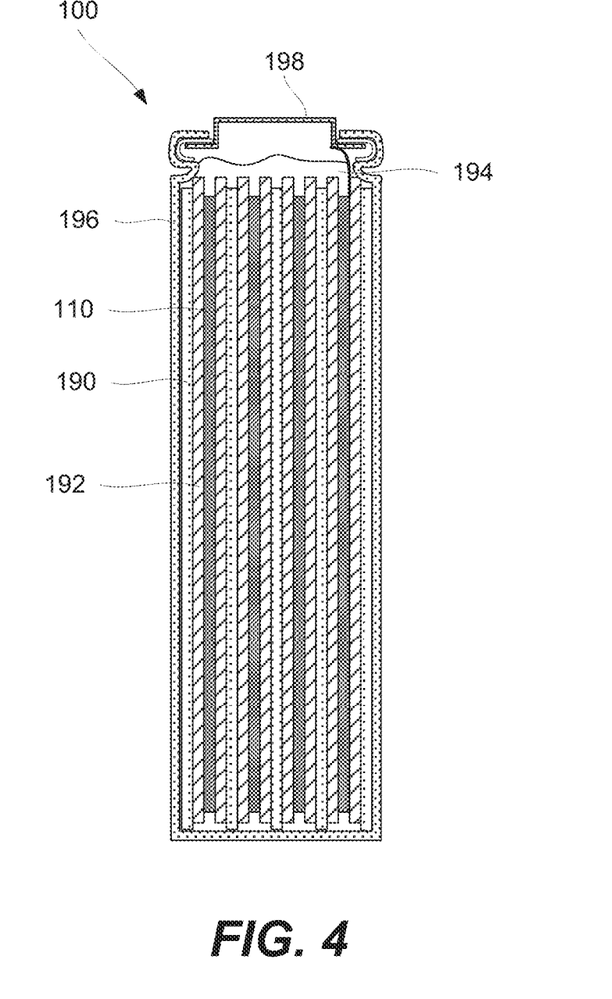
FIG. 4 is a schematic illustration of an electrochemical cell, in accordance with some examples.

FIG. 4 is a schematic illustration of lithium-ion electrochemical cell 100, comprising positive electrode 110, negative electrode 190, and separator 192 arranged in a stack, wound jelly-roll, or any form. Various examples of electrodes are described above. Separator 192 is disposed between positive electrode 110 and negative electrode 190 to prevent direct contact between positive electrode 110 and negative electrode 190 yet allows ionic communication between these electrodes. Specifically, separator 192 may include pores allowing ions to pass. Lithium-ion electrochemical cell 100 also includes electrolyte 194, which operates as a carrier of ions between positive electrode 110 and negative electrode 190 during cycling of lithium-ion electrochemical cell 100. Positive electrode 110 and negative electrode 190 are enclosed by case 196 and lid 198. In some examples, case 196 and/or lid 198 may operate as terminals of lithium-ion electrochemical cell 100, in which case current collectors of positive electrode 110 and/or negative electrode 190 may be connected to case 196 and/or lid 198.

In some examples, case 196 is rigid (e.g., the case is a steel can). Other types of cells may be packed into a flexible, foil-type (e.g., polymer laminate) case. The case material selection depends on polarity of case 196 (e.g., neutral, connected to positive electrodes, connected to negative electrodes) as well as the composition of electrolyte, operating potentials of electrochemical cell 100, and other like factors. For example, when case 196 is connected to a positive electrode, case 196 may be formed from titanium, titanium alloys, aluminum, aluminum alloys, and/or stainless steel. On the other hand, if case 196 is connected to a negative electrode, then case 196 may be made from titanium, titanium alloys, copper, nickel, lead, and stainless steels. The electrical connection between case 196 and an electrode may be established by a direct contact between case 196 and this electrode (e.g., an outer wound of the jelly roll), by a tab connected to the electrode and case 196, and other techniques.

The top of case 196 may be open and used for insertion of the electrode assembly (e.g., a jelly roll) and then capped with a header assembly, which may include a weld plate, a rupture membrane, a PTC-based resettable fuse, and an insulating gasket. The insulating gasket is used to support the conductive components of the header assembly and to insulate these components from case 196. In some examples, a PTC-based resettable fuse is disposed between edges of the rupture membrane and edges of the header cup, effectively interconnecting these two components. At normal operating temperatures, the resistance of PTC-based resettable fuse is low. However, its resistance increases substantially when heated. For example, the PTC-based resettable fuse may be a thermally activated circuit breaker that can electrically disconnect the rupture membrane from the header cup.

Types of electrochemical cells are determined by active materials used on positive and negative electrodes as well as composition of electrolyte. Some examples of positive active materials include $Li (M'_xM''_y)O_2$, where M' and M'' are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g., $Li(Co_xNi_{1-x})O_2$ and $Li(Co_xFe_{1-x})O_2$), $Li_{1-W}(Mn_xNi_YCo_Z)O_2$, (e.g., $Li(Co_xMn_yNi_{1-x-y})O_2$, $Li(Mn_{1/3}Ni_{1/3}Co_{1/3})O_2$, $Li(Mn_{1/3}Ni_{1/3}Co_{1/3-x}Mg_x)O2$, $Li(Mn_{0.4}Ni_{0.4}Co_{0.2})O_2$, $Li(Mn_{0.1}Ni_{0.1}Co_{0.8})O_2$,) $Li_{1-W}(Mn_xNi_YCo_{1-2X})O_2$, $Li_{1-W}(Mn_xNi_YCoAl_W)O_2$, $Li_{1-W}(Ni_{X-}Co_YAl_Z)O_2$ (e.g., $Li(Ni_{0.8}Co_{0.15}Al_{0.05})O_2$), $Li_{1-W}(Ni_{X-}Co_YM_Z)O_2$, where M is a metal, $Li_{1-W}(Ni_xMn_YM_Z)O_2$, where M is a metal, $Li(Ni_{X-Y}Mn_YCr_{2-X})O_4$, $LiM'M''_2O_4$, where M' and M'' are different metals (e.g., $LiMn_{2-Y-Z}Ni_YO_4$, $LiMn_{2-Y-Z}Ni_YLi_ZO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_YO_Z$, e.g., $LiV_3O_8$, $LiV_2O_5$, and $LiV_6O_{13}$.

Active materials may be deposited in active material layers and supported on conductive substrates. The conductive substrates not only provide mechanical support to the active material layers but also deliver electrical currents between the active material layers and battery terminals. Substrate materials may include copper, stainless steel, titanium, aluminum, nickel, chromium, tungsten, metal nitrides, metal carbides, carbon, carbon fiber, graphite, graphene, or combinations of above including multi-layer structures. Various considerations described above with reference to case materials also apply to substrate materials. In some examples, the substrate is a foil, films, mesh, laminate, or any other suitable configurations.

In some embodiments, a separator is disposed between a positive electrode and an adjacent negative electrode. Some example of separator material include poly(ethylene-co-tetrafluoroethylene (PETFE), poly(ethylenechloro-co-trifluoroethylene), polystyrenes, polyvinyl chlorides polypropylene, polyethylene, polyamides, polyimides, polyacrylics, polyacetals, polycarbonates, polyesters, polyetherimides, polyimides, polyketones, polyphenylene ethers, polyphenylene sulfides, glass fiber materials, ceramics, and a polypropylene membrane.

The electrolyte provides ionic communication between positive and negative electrodes in the cell. The electrolyte may be liquid, solid, or gel. A liquid electrolyte may include one or more solvents and one or more lithium-containing salts. Some solvent examples include cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), and amides (e.g., dimethyl formamide). Some examples of salts include $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. The total concentration of one or more salts in the electrolyte is at least about 0.3M or, more specifically, at least about 0.7M.

Experimental Results

Figure 5:
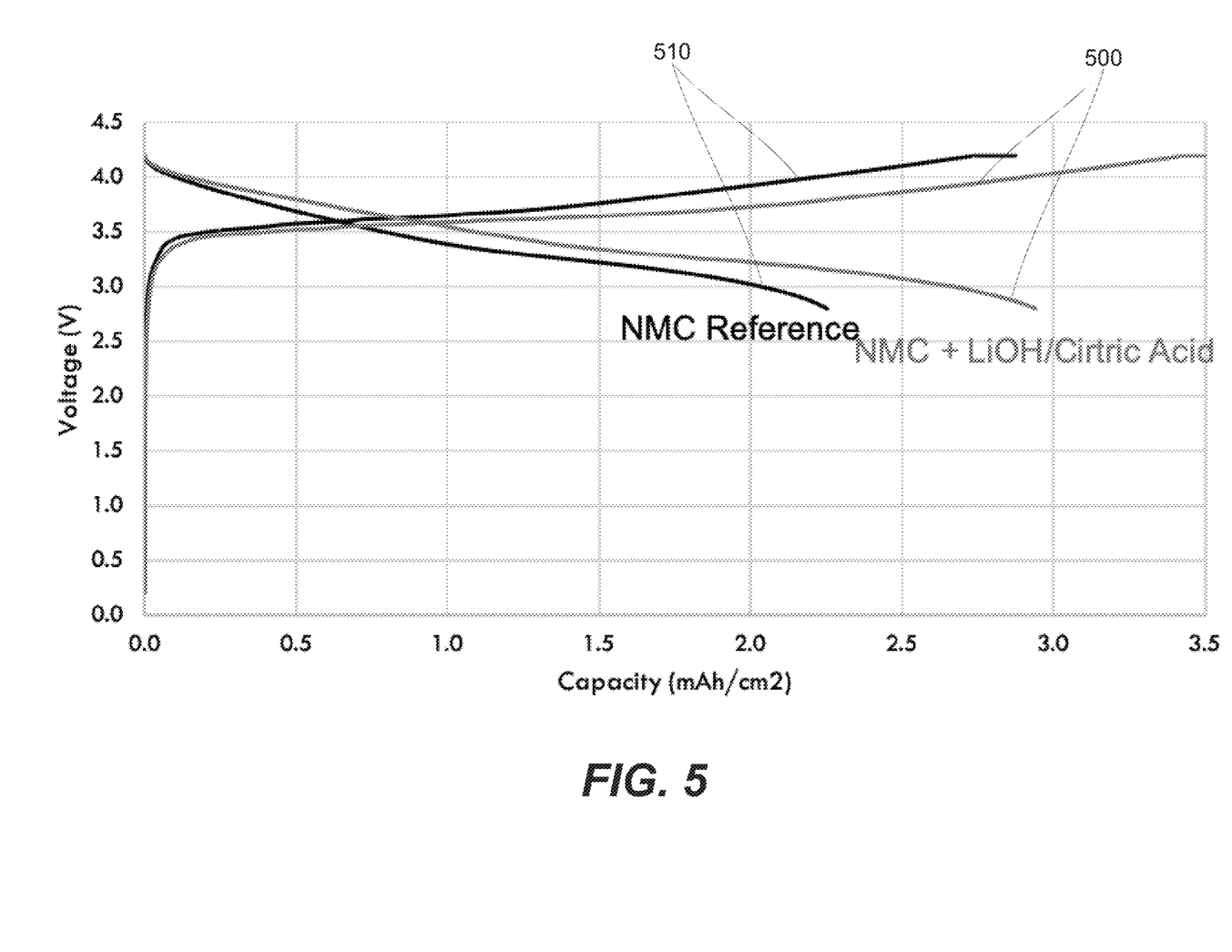
FIG. 5 illustrates electrochemical performance of two sets of cells, one fabricated with a temporary lithium additive and one with the temporary lithium additive.

A series of experiments have been conducted to determine the effect of introducing and subsequently releasing additional lithium ions in electrochemical cells. Two sets of lithium ion cells have been fabricated. One set included reference cells with positive electrodes assembled using lithium nickel manganese cobalt oxide without any temporary lithium additives. Another set included test cells with positive electrodes assembled also using lithium nickel manganese cobalt oxide. However, 5% by weight of LiOH (and citric acid) has been added to the positive electrodes a temporary lithium additive. The electrochemical performance of both sets of cells is shown in FIG. 5. Specifically, the functional capacity evaluation (FCE) of the test cells was 83.8% (lines 500 in FIG. 5) vs. 78.8% for reference cells (lines 510 in FIG. 5).

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. A method of introducing additional lithium ions into a lithium-ion electrochemical cell using a temporary lithium additive, the method comprising:
   introducing the temporary lithium additive into a positive electrode, wherein:
     the positive electrode further comprises a positive active material,
     the positive active material is different from the temporary lithium additive and comprises primary lithium ions;
   introducing an electrolyte between the positive electrode and a negative electrode; and
   applying a voltage between the positive electrode and the negative electrode thereby irreversibly decomposing the temporary lithium additive to produce the additional lithium ions and a gas-phase decomposition product; and
   removing the gas-phase decomposition product from the electrolyte.

2. The method of claim 1, wherein the temporary lithium additive is selected from the group consisting of lithium hydroxide (LiOH), lithium oxide ($LI_2O_2$), and lithium azide ($LiN_3$).

3. The method of claim 1, wherein the temporary lithium additive comprises a first temporary lithium additive and a second temporary lithium additive, having a different composition from the first temporary lithium additive.

4. The method of claim 1, wherein a weight ratio of the temporary lithium additive in an active material layer of the positive electrode is selected such that a ratio of the additional lithium ions to the primary lithium ions is between about 0.1% and 30%.

5. The method of claim 1, wherein the temporary lithium additive is uniformly distributed throughout an active material layer of the positive electrode.

6. The method of claim 1, wherein the positive active material is selected from the group consisting of lithium nickel cobalt aluminum oxide (NCA), lithium manganese nickel oxide (LMNO), lithium iron phosphate (LFP), lithium nickel manganese cobalt oxide (NMC), and lithium cobalt oxide (LCO).

7. The method of claim 1, wherein the positive electrode further comprises a polymer binder.

8. The method of claim 1, wherein the positive electrode further comprises a conductive additive.

9. The method of claim 1, wherein introducing the temporary lithium additive into the positive electrode comprises:
   mixing the temporary lithium additive and the positive active material into slurry;
   coating the slurry onto a current collector; and
   drying the slurry on the current collector to form an active material layer.

10. The method of claim 1, wherein the voltage is within an operating range of the lithium-ion electrochemical cell.

11. The method of claim 1, wherein the voltage is between about 0.1V and 4.5V.

12. The method of claim 1, wherein removing the gas-phase decomposition product comprises reducing pressure within an interior cavity of the lithium-ion electrochemical cell.

13. The method of claim 1, wherein removing the gas-phase decomposition product comprises replacing the electrolyte with a permanent electrolyte.

14. The method of claim 13, wherein composition of the electrolyte is different from composition of the permanent electrolyte.

15. The method of claim 1, wherein the temporary lithium additive is irreversibly decomposed after initial cycling of the lithium-ion electrochemical cell.

16. The method of claim 15, wherein the additional lithium ions, produced while irreversibly decomposing the temporary lithium additive, is selected to match lithium ions that are irreversibly lost during the initial cycling, of the lithium-ion electrochemical cell.

17. The method of claim 1, wherein the temporary lithium additive is lithium hydroxide (LiOH).

18. The method of claim 1, wherein the additional lithium ions are produced while the primary lithium ions remain in the positive active material.

19. The method of claim 1, wherein the additional lithium ions are produced simultaneously with the primary lithium ions being removed from the positive active material.

\* \* \* \* \*